US009923829B1

(12) United States Patent
Liu et al.

(10) Patent No.: US 9,923,829 B1
(45) Date of Patent: *Mar. 20, 2018

(54) AUTOMATIC PROXY DEVICE CONFIGURATION

(71) Applicant: F5 Networks, Inc., Seattle, WA (US)

(72) Inventors: Tao Liu, Issaquah, WA (US); Song Bo Zheng, Bellevue, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,203

(22) Filed: Jan. 29, 2016

Related U.S. Application Data

(63) Continuation of application No. 13/240,812, filed on Sep. 22, 2011, now Pat. No. 9,264,432.

(51) Int. Cl.
| | |
|---|---|
| *H04L 1/00* | (2006.01) |
| *H04L 12/803* | (2013.01) |
| *H04L 29/06* | (2006.01) |
| *H04L 29/08* | (2006.01) |

(52) U.S. Cl.
CPC ........ *H04L 47/125* (2013.01); *H04L 63/0892* (2013.01); *H04L 67/28* (2013.01); *H04L 69/16* (2013.01)

(58) Field of Classification Search
None
See application file for complete search history.

(56) References Cited

U.S. PATENT DOCUMENTS

| | | |
|---|---|---|
| 5,513,314 A | 4/1996 | Kandasamy et al. |
| 6,430,619 B1 | 8/2002 | Sitaraman et al. |
| 6,539,425 B1 | 3/2003 | Stevens et al. |
| 7,296,078 B2 | 11/2007 | Sanchez Herrero et al. |
| 7,899,918 B1 | 3/2011 | Potter et al. |
| 8,201,219 B2 | 8/2012 | Jones |
| 8,555,350 B1 | 10/2013 | Shatzkamer |
| 8,621,078 B1 | 12/2013 | Mukerji et al. |
| 8,788,570 B2 | 7/2014 | Goel |

(Continued)

OTHER PUBLICATIONS

European Search Report for Application No. 13824898.4 dated Jul. 4, 2016, 15 pages.

(Continued)

*Primary Examiner* — Kibrom T Hailu
(74) *Attorney, Agent, or Firm* — John W. Branch; Lowe Graham Jones PLLC

(57) ABSTRACT

A traffic management device (TMD), system, and processor-readable storage medium directed towards automatically configuring an AAA proxy device (also referred to herein as "the proxy") to load-balance AAA request messages across a plurality of AAA server devices. In one embodiment the proxy receives an AAA handshake message from an AAA client device. The proxy forwards the handshake message to each of the plurality of server devices and, in reply, receives an AAA handshake response message from each of the plurality of server devices. The proxy extracts attributes from each of the handshake response messages and automatically configures itself based on the extracted attributes. The proxy then load-balances, modifies and/or routes subsequently received AAA request messages based on the extracted attributes.

18 Claims, 4 Drawing Sheets

(56) References Cited

U.S. PATENT DOCUMENTS

| | | |
|---|---|---|
| 8,904,028 B2 | 12/2014 | Iannaccone et al. |
| 2003/0126230 A1 | 7/2003 | Donatelli et al. |
| 2004/0047348 A1 | 3/2004 | O'Neill |
| 2005/0091396 A1 | 4/2005 | Nilakantan et al. |
| 2005/0188109 A1 | 8/2005 | Shiga et al. |
| 2006/0143497 A1 | 6/2006 | Zohar et al. |
| 2006/0171365 A1 | 8/2006 | Borella |
| 2007/0192769 A1 | 8/2007 | Mimura et al. |
| 2007/0258465 A1 | 11/2007 | Ma et al. |
| 2008/0022392 A1* | 1/2008 | Karpati .................. H04L 63/20 726/15 |
| 2009/0083861 A1 | 3/2009 | Jones |
| 2009/0216920 A1 | 8/2009 | Lauterbach et al. |
| 2009/0247120 A1 | 10/2009 | Heutschi |
| 2009/0265467 A1* | 10/2009 | Peles ...................... H04L 47/10 709/226 |
| 2010/0081394 A1 | 3/2010 | Sindhu et al. |
| 2010/0128598 A1 | 5/2010 | Gandhewar et al. |
| 2010/0287227 A1 | 11/2010 | Goel et al. |
| 2010/0299451 A1 | 11/2010 | Yigang et al. |
| 2011/0026403 A1 | 2/2011 | Shao et al. |
| 2011/0040845 A1 | 2/2011 | Cai et al. |
| 2011/0185065 A1 | 7/2011 | Stanisic et al. |
| 2011/0200054 A1 | 8/2011 | Craig et al. |
| 2011/0202614 A1 | 8/2011 | Graig et al. |
| 2011/0231649 A1 | 9/2011 | Sapin |
| 2011/0231652 A1 | 9/2011 | Sapin |
| 2011/0231653 A1 | 9/2011 | Sapin |
| 2012/0131202 A1 | 5/2012 | Qiu et al. |
| 2012/0185920 A1* | 7/2012 | Zmener ................. H04L 63/083 726/4 |
| 2012/0240184 A1 | 9/2012 | Nat |
| 2013/0097330 A1 | 4/2013 | Qiu et al. |
| 2013/0215750 A1 | 8/2013 | Beecroft et al. |
| 2014/0006632 A1 | 1/2014 | Evens |

OTHER PUBLICATIONS

Ko et al., "Overcoming Large Data Transfer Bottlenecks in RESTful Service Orchestrations," 2012 IEEE 19th International Conference on Web Services, 3 pages.

Official Communication for U.S. Appl. No. 13/828,664 dated Jan. 18, 2017, 22 pages.

Official Communication for U.S. Appl. No. 14/871,453 dated Mar. 23, 2016, 5 pages.

Fajardo, V. I., "Open Diameter Software Architecture," Version 1.0.7, Jun. 25, 2004, 6 pages http://diameter.sourceforge.net/diameter-architecture/index.html, accessed Sep. 2, 2008.

"Deploying the BIG-IP LTM for Diameter Load Balancing" Deployment Guide, Version 1.0, Sep. 22, 2010, 21 pages.

"Respond to server depending on TCP::client_port," DevCentral Forums, accessed Mar. 26, 2010 http://devcentral.f5.com/Default.aspx?tabid=53&forumid=5&tpage=1&v. . . .

Liu, J. et al., "Introduction to Diameter," IBM, Jan. 24, 2006, 11 pages. http://www.ibm.com/developerworks/library/wi-diameter/index.html.

"Diameter (protocol)," Wikipedia.com, accessed Feb. 3, 2012, 10 pages http://en.wikipedia.org/wiki/Diameter_(protocol).

MacVittie, L., "Message-Based Load Balancing," F5, 2009, 9 pages.

Official Communication for U.S. Appl. No. 13/789,386 dated Jan. 30, 2015, 22 pages.

Official Communication for U.S. Appl. No. 13/789,386 dated Aug. 11, 2015, 19 pages.

Official Communication for U.S. Appl. No. 13/240,812 dated Apr. 23, 2015, 11 pages.

Official Communication for U.S. Appl. No. 13/240,812 dated Oct. 13, 2015, 9 pages.

International Search Report and written Opinion for Application No. PCT/US2014/019129 dated Apr. 29, 2014, 9 pages.

Official Communication for U.S. Appl. No. 13/773,332 dated Jan. 8, 2015, 20 pages.

Official Communication for U.S. Appl. No. 13/773,332 dated Jun. 30, 2015, 5 pages.

Official Communication for U.S. Appl. No. 13/828,664 dated Feb. 25, 2015, 18 pages.

Official Communication for U.S. Appl. No. 13/828,664 dated Dec. 18, 2015, 18 pages.

Official Communication for U.S. Appl. No. 14/871,453 dated Jul. 25, 2016, 6 pages.

Official Communication for U.S. Appl. No. 13/789,386 dated Aug. 4, 2018, 11 pages.

MacVittie "Message Based Load Balancing" (Technical Brief (2010), pages 1-9).

Official Communication for U.S. Appl. No. 13/828,664 dated Aug. 4, 2017, 24 pages.

* cited by examiner

AUTOMATIC PROXY DEVICE CONFIGURATION

CROSS-REFERENCE TO RELATED APPLICATION(S)

This Utility Patent Application is a Continuation of U.S. patent application Ser. No. 13/240,812 filed on Sep. 22, 2011, now U.S. Pat. No. 9,264,432 issued on Feb. 16, 2016, the benefit of which is claimed under 35 U.S.C. § 120, and which is further incorporated by reference in its entirety.

TECHNICAL FIELD

The present invention relates generally to network communications, and more particularly, but not exclusively, to automatically configuring a proxy network device for load-balancing.

TECHNICAL BACKGROUND

Load balancing has been integral to successfully providing high availability and nearly transparent scalability to web-based applications for almost two decades. Used at first to scale web-oriented protocols such as (Hypertext Transfer Protocol) HTTP, once the integration of web-based applications with other key data center protocols became more prevalent, load balancing became more of an imperative for those protocols as well.

Unlike HTTP, which is synchronous and stateless, some protocols—such as, Remote Authentication Dial-In User Service (RADIUS), Diameter, and Session Initiation Protocol (SIP)—are not only asynchronous but also do not adhere to a single request-reply communication sequence. This makes it more difficult to distribute those protocols because most load balancing systems are designed to operate best in a synchronous messaging environment in which a single request is made and responded to before another is processed.

Some of the most demanding environments require scalability solutions for such protocols. Service providers and financial institutions routinely process multi-gigabits of data in intervals that are unprecedented even on the most highly trafficked websites. These environments demand high levels of availability while simultaneously maintaining strenuous performance criteria. For example, SIP is one of the most commonly used signaling protocols in the world, but its reliance on authentication protocols such as Diameter, RADIUS, and the like, make it very difficult to scale efficiently.

One of the challenges associated with load-balancing these protocols is configuring a proxy device to distribute request messages across multiple server devices. Therefore, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the described embodiments, reference will be made to the following Detailed Description, which is to be read in association with the accompanying drawings, wherein.

DETAILED DESCRIPTION

Figure 1:
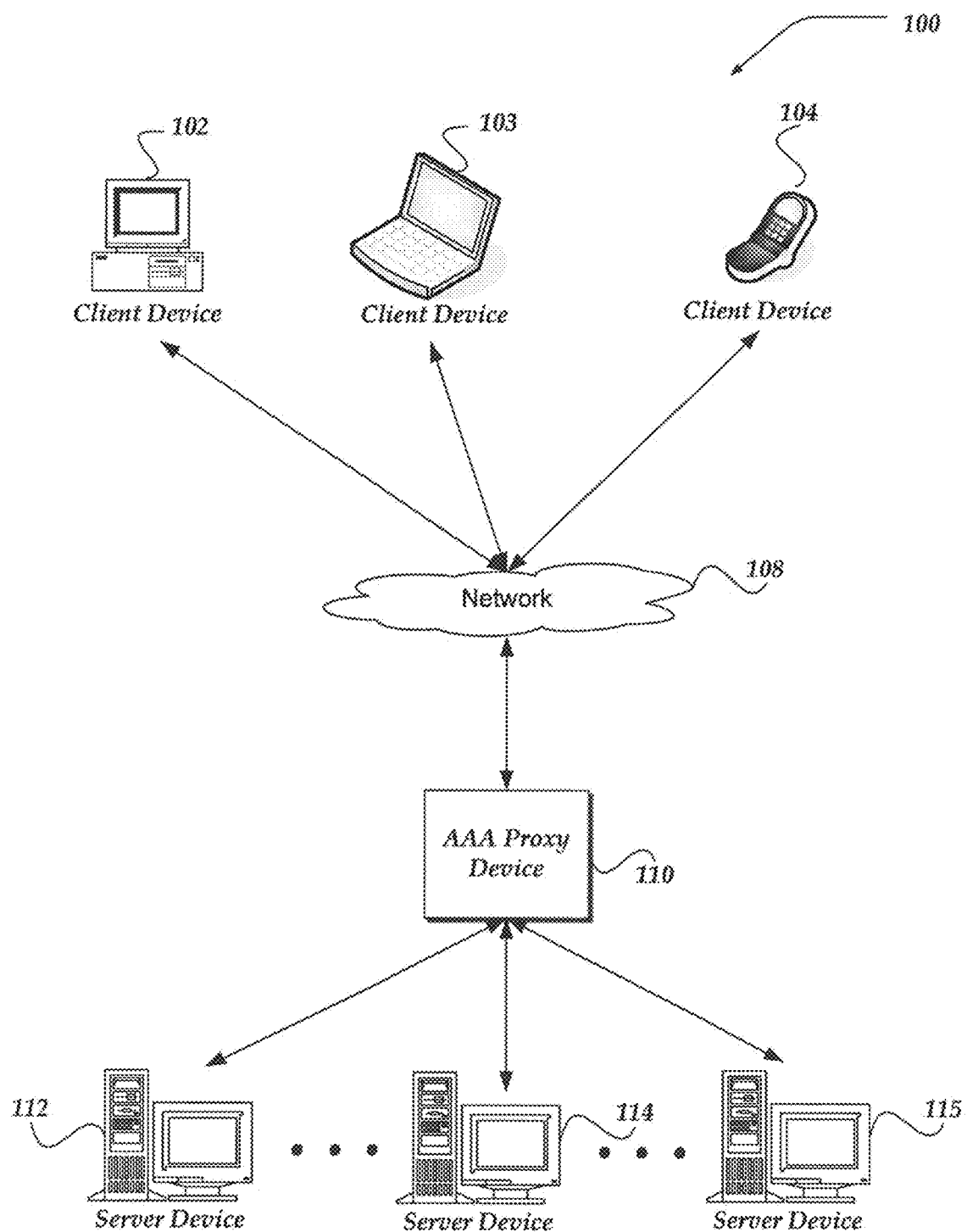
FIG. 1 shows components of an illustrative environment in which the described embodiments may be practiced.

In the following detailed description of exemplary embodiments, reference is made to the accompanied drawings, which form a part hereof, and which show by way of illustration examples by which the described embodiments may be practiced. Sufficient detail is provided to enable those skilled in the art to practice the described embodiments, and it is to be understood that other embodiments may be utilized, and other changes may be made, without departing from the spirit or scope. Furthermore, references to "one embodiment" are not required to pertain to the same or singular embodiment, though they may. The following detailed description is, therefore, not to be taken in a limiting sense, and the scope of the described embodiments is defined only by the appended claims.

Throughout the specification and claims, the following terms take the meanings explicitly associated herein, unless the context clearly dictates otherwise. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "network connection" refers to a collection of links and/or software elements that enable a computing device to communicate with another computing device over a network. One such network connection may be a Transmission Control Protocol (TCP) connection. TCP connections are virtual connections between two network nodes, and are typically established through a TCP handshake protocol. The TCP protocol is described in more detail in Request for Comments (RFC) 793, available from the Internet Engineering Task Force (IETF), and is hereby incorporated by reference in its entirety. A network connection "over" a particular path or link refers to a network connection that employs the specified path or link to establish and/or maintain a communication. The term "node" refers to a network element that typically interconnects one or more devices, or even networks.

As used herein, an Authentication, Authorization, and Accounting (AAA) protocol refers to any protocol used to authenticate, authorize, or perform accounting on an entity. Non-limiting examples of AAA protocols include RADIUS, Diameter, Terminal Access Controller Access-Control System (TACACS), Terminal Access Controller Access-Control System Plus (TACACS+), and the like. AAA protocols may be used over any communication technology, for example, wireless, Digital Subscriber Line (DSL), Mobile Internet Protocol (IP), Ethernet, and the like.

As used herein, authentication refers to verifying the identity of an entity. In one embodiment an entity's identity is authenticated using an identifier and corresponding credentials. Examples of identifiers include usernames, email addresses, account numbers, and the like. Examples of credentials include passwords, one-time tokens, digital certificates, phone numbers (calling/called), and biometric data such as fingerprints, retinal scans, voice prints, and the like. Example authentication protocols include Diameter (RFC 3588, available from the IETF, which is hereby included in its entirety by reference), RADIUS, TACACS, TACACS+, Kerberos, and the like.

As used herein, authorization refers to determining if a particular entity has permission to access a resource or perform a given activity on a given service. Authorization may be determined based on a range of restrictions, for example, identity-based restrictions, time-of-day restrictions, physical location restrictions, multiple access restrictions, or the like.

As used herein, accounting refers to the tracking of network interaction and/or resource consumption by entities. In one embodiment, accounting gathers one or more of the following: the identity of the entity, the nature of the service delivered, when the service began, when the service ended, authentication failures, authorization failures, and the like. In one embodiment, accounting information may be used for capacity and trend analysis, cost allocation, billing, and the like. In another embodiment, accounting includes auditing functionality, which for example, enables verifying the correctness of procedures.

As used herein, an AAA client device refers to a computing device that participates in an AAA transaction by requesting an AAA service. As used herein, an AAA server device refers to a computing device that participates in an AAA transaction by receiving, performing, and/or responding to an AAA service request. However, in one embodiment, AAA server devices may request an AAA service and AAA client devices may receive, perform, and/or respond to an AAA service request. Thus a device may act as a server in some situations, while acting as a client in other situations.

As used herein, an AAA peer device (also referred to as an AAA peer or just a peer) refers to any AAA computing device that requests services and/or receives, performs, or responds to AAA service requests.

As used herein, an AAA session refers to a logical connection between two or more AAA peers over which AAA service requests may be submitted and responded to through an exchange of AAA messages.

As used herein, an AAA message refers to a message exchanged by AAA peers to request an AAA service or to respond to an AAA service request. In one embodiment an AAA message includes a header and a collection of Attribute Value Pairs (AVP). In one embodiment the AAA message header includes a command code, an Application-ID, a Hop-by-Hop Identifier (ID), an End-to-End ID, and the like. In one embodiment, AVPs may include at least an AVP code and corresponding AVP data. AVPs may contain information pertaining to, for example, authentication, accounting, authorization, routing and security, and configuration details. In one embodiment AVPs and/or the contents of an AAA message header are extensible. For example, the AAA protocol may be extended to include new command codes or Application-IDs, as well as new AVPs that are not included in any formal definition of the AAA protocol.

As used herein, an Attribute Value Pair (AVP) refers to a tuple (<attribute name, value>) used to encapsulate protocol-specific data. For example, an AVP may encapsulate routing information. In one embodiment, AVPs enable extensibility by enabling additional attributes to be defined without modifying existing standards or source code.

As used herein, a realm refers to the string in a Network Access Identifier (NAI) that immediately follows the '@' character, where an NAI is formatted as username@realm. In one embodiment a realm may refer to a domain name such as "uspto.gov".

As used herein, an origin-realm refers to a realm associated with the AAA client device. In one embodiment an origin-realm is stored in an AVP of a request message.

As used herein, a destination-realm refers to a realm associated with the AAA server device. In one embodiment the destination-realm is stored in an AVP of a request message.

As used herein, a host refers to a computing device as identified by hostname.realm. For example, if someonelineservice.com employed a mail server named mail1, the corresponding host would be identified as mail1.someonlineservice.com.

As used herein, an AAA proxy refers to a computing device that receives and forwards messages between AAA peer devices.

Briefly described is a mechanism for automatically configuring an AAA proxy device (also referred to herein as "the proxy") to load-balance AAA request messages across a plurality of AAA server devices. In one embodiment the proxy receives an AAA handshake message from an AAA client device. The proxy forwards the handshake message to each of the plurality of server devices and, in reply, receives an AAA handshake response message from each of the plurality of server devices. The proxy extracts attributes from each of the handshake response messages and automatically configures itself based on the extracted attributes. The proxy then load-balances, modifies and/or routes subsequently received AAA request messages based on the extracted attributes.

Illustrative Operating Environment

FIG. 1 shows components of an illustrative environment 100 in which the described embodiments may be practiced. Not all the components may be required to practice the described embodiments, and variations in the arrangement and type of the components may be made without departing from the spirit or scope of the described embodiments. FIG. 1 illustrates client devices 102-104, network 108, AAA proxy device 110, and server devices 112-115.

Generally, client devices 102-104 may include virtually any computing device capable of connecting to another computing device and receiving information. Such devices may include personal computers, multiprocessor systems, microprocessor-based or programmable consumer electronics, network devices, server devices, and the like. Client devices 102-104 may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 102-104 may also include virtual computing devices running in a hypervisor or some other virtualization environment. As such, client devices 102-104 may range widely in terms of capabilities and features.

Network 108 is configured to couple network enabled devices, such as client devices 102-104, AAA proxy device 110, and server devices 112-115, with other network enabled devices. Network 108 is enabled to employ any form of computer readable media for communicating information from one electronic device to another. In one embodiment, network 108 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs to enable messages to be sent from one to another. Also, communication links within LANs typically include fiber optics, twisted wire pair, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 108 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, 4G, and future access networks may enable wide area coverage for network devices, such as client devices 102-104, or the like, with various degrees of mobility. For example, network 108 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link, a DSL modem, a cable modem, a fiber optic modem, an 802.11 (Wi-Fi) receiver, and the like. In essence, network 108 includes any communication method by which information may travel between one network device and another network device.

One embodiment of a network device that could be used as AAA proxy device 110 is described in more detail below in conjunction with FIG. 3. Briefly, however, AAA proxy device 110 includes virtually any network device that manages network traffic. Such devices include, for example, routers, proxies, firewalls, load balancers, cache devices, application accelerators, devices that perform network address translation, any combination of the preceding devices, or the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets.

As described in more detail below, AAA proxy device 110 may receive an AAA handshake message from one of client devices 102-104, forward the received AAA request message to one or more of server devices 112-115, receive AAA handshake response messages from each of the one or more server devices 112-115, extract attributes from the AAA handshake response messages, and route, modify, and/or load-balance subsequently received AAA request messages based on the extracted attributes. For example, AAA request messages subsequently received from the client device may be load-balanced between server devices 112-115 based on the attributes extracted from the AAA handshake response messages received from server devices 112-115.

Server devices 112-115 are configured to operate as an AAA server, either individually or collectively. In one embodiment, each of server devices 112-115 may individually comprise a server capable of performing some or all AAA services, where a service is identified by an Application-ID. In another embodiment, different server devices may provide different AAA services, collectively providing a complete set of AAA services. In either embodiment, AAA proxy device 110 distributes AAA request messages to the appropriate server device based on a command code and/or an Application-ID contained in the AAA request message and attributes extracted from handshake response messages received from the server devices.

It is further noted that terms such as client and server may refer to functions within a device. As such, virtually any device may be configured to operate as a client, a server, or even include both a client and a server function. Furthermore, where two or more peers are employed, any one of them may be designated as a client or as a server, and be configured to conform to the teachings of the present invention.

Devices that may operate as servers 112-115 include various network devices, including, but not limited to personal computers, desktop computers, multiprocessor systems, microprocessor-based or programmable consumer electronics, network PCs, server devices, network appliances, and the like. It should be noted that while servers 112-115 are each illustrated as a single network device, embodiments are not so limited. Thus, in another embodiment, each of servers 112-115 may be distributed across one or more distinct network devices. For example, in one embodiment, each of servers 112-115 may be implemented using a cloud architecture, distributed over a plurality of network devices, or any of a variety of configurations. These embodiments are not meant to be construed as being limited to any one particular configuration.

Illustrative AAA Peer Device Environment

Figure 2:
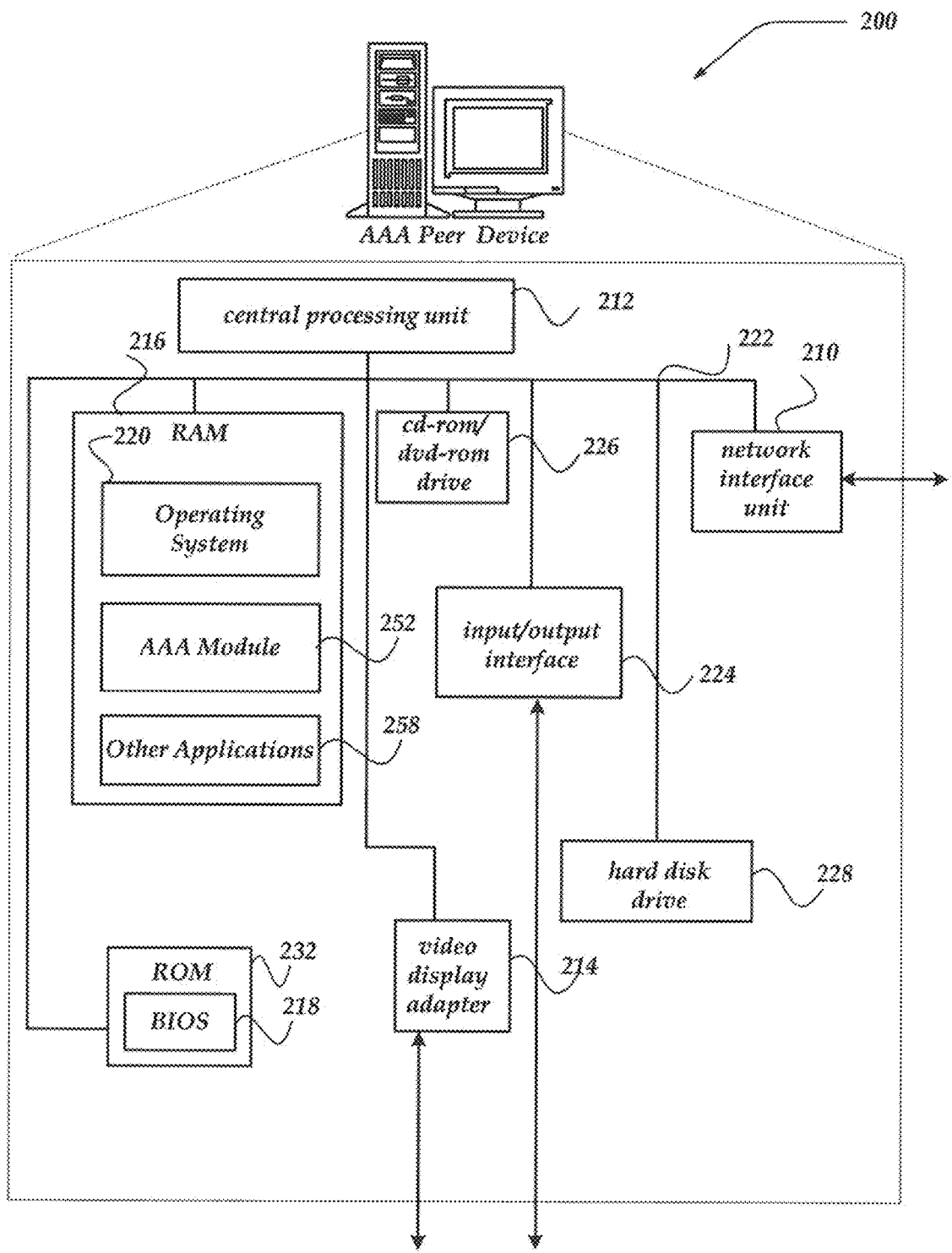
FIG. 2 shows one embodiment of an Authentication, Authorization, and Accounting (AAA) peer device, according to one embodiment of the invention.

FIG. 2 shows one embodiment of an AAA peer device, according to one embodiment of the invention. AAA peer device 200 may include many more or less components than those shown. The components shown, however, are sufficient to disclose an illustrative embodiment for practicing the invention. AAA peer device 200 may represent, for example, client devices 102-104 or server devices 112-115.

AAA peer device 200 includes central processing unit 212, video display adapter 214, and a mass memory, all in communication with each other via bus 222. The mass memory generally includes Random Access Memory (RAM) 216, Read Only Memory (ROM) 232, and one or more permanent mass storage devices, such as hard disk drive 228, tape drive, Compact-Disc ROM (CD-ROM)/Digital Versatile Disc ROM (DVD-ROM) drive 226, and/or floppy disk drive. Hard disk drive 228 may be utilized to store, among other things, application programs, databases, AAA messages, and the like. The mass memory stores operating system 220 for controlling the operation of AAA peer device 200. Basic input/output system ("BIOS") 218 is also provided for controlling the low-level operation of network device 200. AAA peer device 200 also includes AAA module 252 and other application 258.

As illustrated in FIG. 2, AAA peer device 200 also can communicate with the Internet, or some other communications network via network interface unit 210, which is constructed for use with various communication protocols including the TCP/IP protocol. Network interface unit 210 is sometimes known as a transceiver, transceiving device, or network interface card (NIC).

AAA peer device 200 may also include input/output interface 224 for communicating with external devices, such as a mouse, keyboard, scanner, or other input devices not shown in FIG. 2.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices, or any other non-transitory medium which can be used to store the desired information and which can be accessed by a computing device.

The mass memory also stores program code and data. One or more applications 258 are loaded into mass memory and run on operating system 220. Examples of application programs may include email programs, routing programs, schedulers, calendars, database programs, word processing programs, HTTP programs, traffic management programs, security programs, and so forth. Applications 258 may also include a variety of web services that are configured to provide content, including messages, over a network to another computing device. These web services include for example, a web server, messaging server, a File Transfer Protocol (FTP) server, a database server, a content server, or the like. These web services may provide the content including messages over the network using any of a variety of formats, including, but not limited to Wireless Application Protocol (WAP), Handheld Device Markup Language (HDML), Wireless Markup Language (WML), Standard Generalized Markup Language (SGML), Hypertext Markup Language (HTML), eXensible Markup Language (XML), compact HTML (cHTML), eXtensible HTML (xHTML), or the like.

Figure 4:
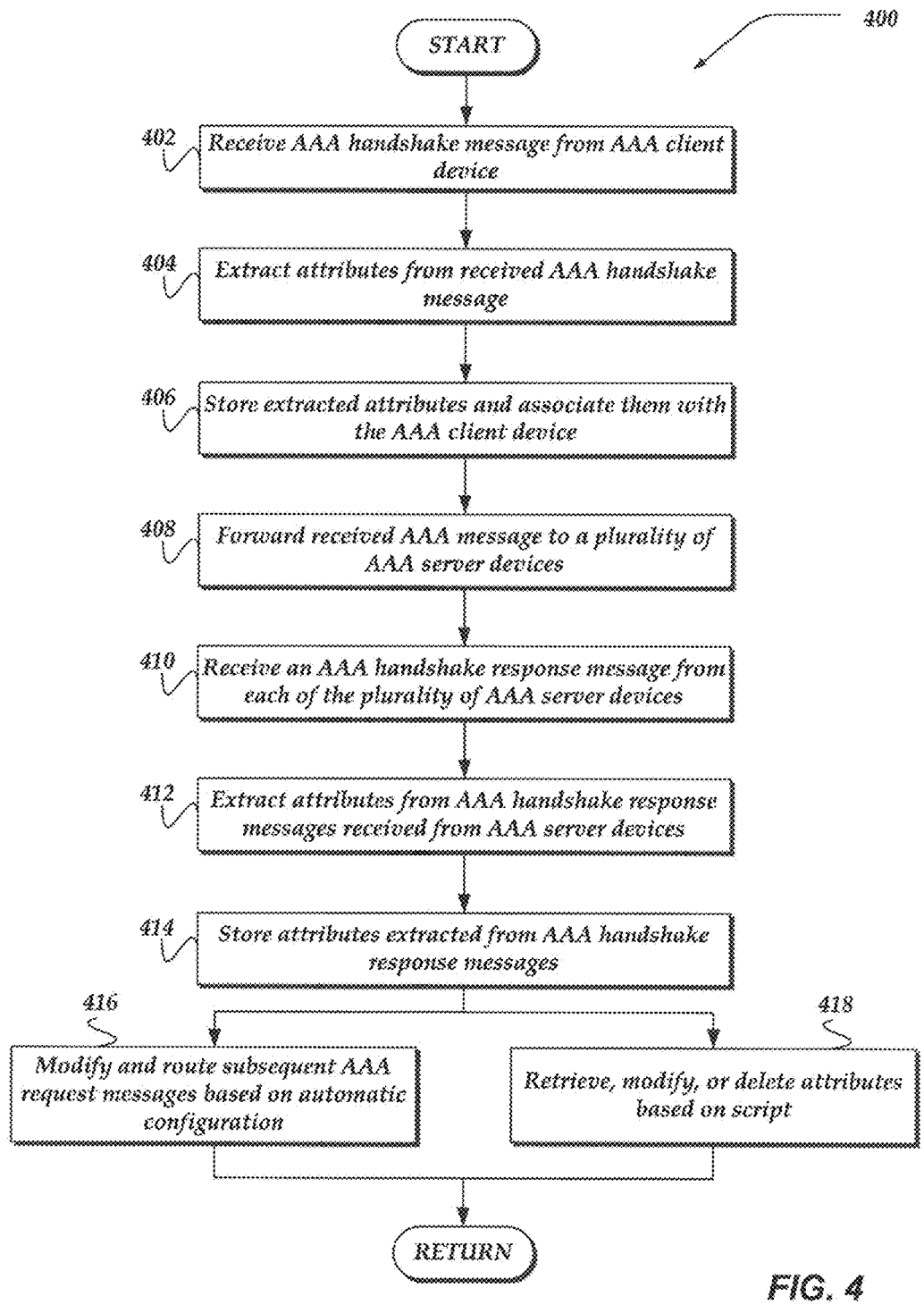
FIG. 4 illustrates a logical flow diagram generally showing one embodiment of a process for automatically configuring an AAA proxy device to load-balance AAA request messages.

In one embodiment, AAA module 252 may send AAA requests and/or receive, process, and respond to AAA requests, as discussed below in conjunction with FIG. 4.

Illustrative Server Device Environment

Figure 3:
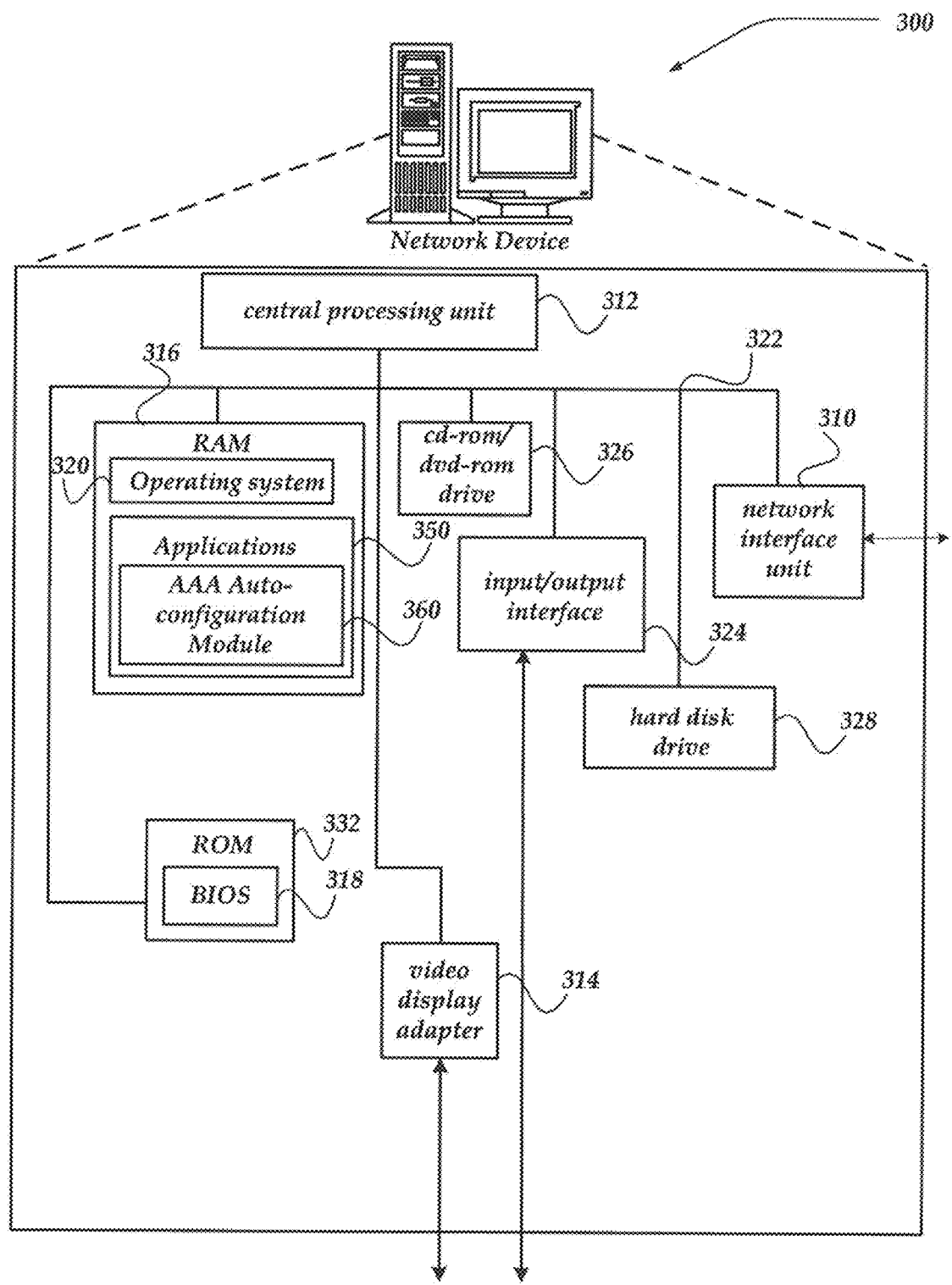
FIG. 3 shows one embodiment of a network device, according to one embodiment of the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, AAA proxy device 110 of FIG. 1.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, CD-ROM/DVD-ROM drive 326, and/or floppy disk drive. The mass memory stores operating system 320 for controlling the operation of server device 300. BIOS 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

Network device 300 may also include input/output interface 324 for communicating with external devices, such as a mouse, keyboard, scanner, or other input devices not shown in FIG. 3.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices, or any other non-transitory medium which can be used to store the desired information and which can be accessed by a computing device.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include AAA auto-configuration module 360. AAA auto-configuration module 360 may perform steps associated with an AAA proxy device as described below in conjunction with FIG. 4.

In one embodiment, the network device 300 includes at least one Application Specific Integrated Circuit (ASIC) chip (not shown) coupled to bus 322. The ASIC chip can include logic that performs some of the actions of network device 300. For example, in one embodiment, the ASIC chip can perform a number of packet processing functions for incoming and/or outgoing packets. In one embodiment, the ASIC chip can perform at least a portion of the logic to enable the operation of AAA auto-configuration module 360.

In one embodiment, network device 300 can further include one or more field-programmable gate arrays (FPGA) (not shown), instead of, or in addition to, the ASIC chip. A number of functions of the network device can be performed by the ASIC chip, the FPGA, by CPU 312 with instructions stored in memory, or by any combination of the ASIC chip, FPGA, and CPU.

Generalized Operation

The operation of certain aspects will now be described with respect to FIG. 4. FIG. 4 illustrates a logical flow diagram generally showing one embodiment of a process for automatically configuring an AAA proxy device to load-balance AAA messages. In one embodiment, process 400 may be implemented by AAA proxy device 110.

Process 400 begins, after a start block, at block 402 where in one embodiment the AAA proxy device receives an AAA handshake message from a client device. In one embodiment the client device comprises one of client devices 102-104 as depicted in FIG. 1. However any AAA peer device, including one of server devices 112-115 as depicted in FIG. 1, may similarly send a handshake message.

In one embodiment AAA messages, such as the AAA handshake message, include a header and a plurality of AVPs. In one embodiment the AAA message's header includes a command code, which may comprise one of a set of standardized codes used across vendors and implementations. Additionally or alternatively, the command code may be vendor specific. In one embodiment an AAA message's command code is associated with a set of AVPs that must be present in that message, as well as a set of AVPs that may be present in that message. One example of a command code used in an AAA handshake message is a Capabilities-Exchange-Request (CER) message as defined by the Diameter AAA protocol.

In one embodiment the message's header may also include command flags which indicate, for example, whether the message comprises a request, a response to a request, whether the message may be proxied, and the like. For example, a CER message may have a command flag set indicating the message is a request message.

In addition, AAA messages, such as the received AAA handshake message, may include AVPs carrying specific authentication, accounting, authorization, routing, and security information. In one embodiment AVP's and their meanings are standardized. In another embodiment, AVPs may be vendor specific, and as such may be extended or amended outside of any standardization process. For example, a CER message may include AVPs such as origin-host and origin-realm. After the handshake is complete, subsequent requests may include destination-host and destination realm AVPs. Host-IP-Address, Vendor-Id, product-name, origin-state-id, supported-vendor-id, acct-application-id, Auth-Application-Id and the like.

At block 404, in one embodiment, the AAA proxy device extracts attributes from the AAA handshake message. In one embodiment the extracted attributes comprise message header values, AVPs, and the like, or a combination thereof. For example, in one embodiment, the AAA proxy device extracts one or more of origin-host and origin-realm AVPs, and the like, from a CER message. Additionally or alternatively, the proxy device may extract a version, Application-ID, Hop-by-hop-ID, End-to-end-ID, and the like from the AAA message header. In another embodiment the AAA proxy device extracts vendor specific AVPs.

In one embodiment the AAA proxy device verifies the correctness of the received AAA message. In one embodiment, correctness of an AAA message is determined by verifying that, for the extracted command code, AVPs that must be included are included. In another embodiment, correctness is determined by verifying that, for the extracted command code, AVPs that are not "must have" or "may have" are not included. In one embodiment, if the received message is determined to be incorrect, an error message is returned to the client device and the process terminates at the return block. However, if the received message is determined to be correct, the process continues to block 406.

At block 406, in one embodiment, the AAA proxy device stores the extracted attributes and stores an association of the extracted attributes with the sending client device. One of ordinary skill in the art will appreciate that, to date, this configuring of the proxy device was performed manually by a system administrator, if at all.

In one embodiment, stored attributes extracted from a handshake message may be used when modifying or generating an AAA response message sent to the client device. For example, after a client device has completed a handshake, the client device may send an AAA request message to the proxy device. The proxy device may determine a server device (as discussed below in conjunction with block 416) to forward the AAA request message to, and then replace AVPs in the AAA request message with AVPs associated with the server device. Then, upon receiving an AAA response message from the server device, the proxy device replaces AVPs in the AAA response message with AVPs associated with the client device.

At block 408, the AAA proxy device forwards the received handshake message to a plurality of AAA server devices, thereby initiating an AAA session between the client device and each of the plurality of server devices. In this way, future requests from the client device may be load-balanced across the plurality of AAA server devices.

In another embodiment, the AAA proxy device may partition AAA server devices into groups, and selectively initiate a handshake between the client device and each of the server devices in one of these groups. In this way, load-balancing across server devices in the group is achieved without initiating a connection to every server device in the plurality of server devices.

At block 410, an AAA handshake response message is received from each of the server devices. In one embodiment the AAA response handshake message comprises a CEA message. In one embodiment the AAA response handshake message includes a header and one or more AVPs, similar to the AAA handshake message. In one embodiment, the AAA handshake response message header includes values such as version, Application-ID, Hop-by-hop-ID, End-to-end-ID, and the like. Additionally or alternatively, the AAA handshake response message may include one or more AVPs such as origin-host, origin-realm, and the like. In one embodiment the AAA handshake response message indicates Application-IDs supported by the server device.

At block 412, in one embodiment, the attributes of each of the AAA handshake response message(s) are extracted, as described above with regard to block 404. In one embodiment the attributes of an AAA handshake response message are stored and associated with the corresponding server device.

In one embodiment, the proxy device generates a new AAA handshake response message based on the received AAA handshake response messages, and transmits the generated AAA handshake response message to the client device. In one embodiment, the generated AAA handshake response message aggregates the services supported by each of the plurality of server devices. For example, if one of the server devices indicates it supports authentication, while another server device supports authorization, then the generated AAA handshake response message will, in one embodiment, indicate that both authentication and authorization are supported.

At block 414, in one embodiment, the AAA proxy device stores attributes extracted from each of the AAA handshake response messages, as well as an association between the extracted attributes and the corresponding server device. In one embodiment the AAA proxy device configures itself based on this stored information. For example, if a first server device indicates it supports an authentication service, while a second server device indicates it supports an authorization service, then the AAA proxy device may configure itself to forward subsequent AAA messages requesting authentication to the first server device and subsequent AAA messages requesting authorization to the second server device.

At block 416, subsequent AAA request messages are modified and routed to particular server devices. In one embodiment, AAA request messages may include any type of request. Examples of AAA request messages include Accounting-Request (ACR), Re-Auth-Request (RAR), and the like.

In one embodiment, an AAA request message is routed to a server device that, based on a previously received AAA handshake response message, supports the Application-ID contained in the request message. For example, if a first server device indicated it supported an authentication service, while a second server device indicated it supported an authorization service, the proxy device may route AAA request messages for authorization services to the second server device.

In another embodiment, the AAA request message is routed to a server device in accordance with a load-balancing scheme, including a round-robin distribution or distribution based on the IP address of the client device, or the like. However, any other method of load-balancing is similarly contemplated.

Moreover, attributes extracted from AAA handshake response messages may be used to modify subsequent AAA request messages. In one embodiment, the proxy device may replace an AVP in an AAA request message with a corresponding AVP associated with the destination server device. However, it is also contemplated that any part of the AAA request message may be similarly modified or replaced.

For example, if an AAA request message includes an origin-realm AVP of "f5.com", but the destination server device will typically respond only to requests from clients in the "uspto.gov" realm, the proxy device may modify the AAA request message to have an origin-realm of "uspto.gov" before forwarding the message to the server device.

In another embodiment, the received AAA request message is responded to by the AAA proxy device without forwarding the AAA request message to any of the server devices. In one embodiment the AAA proxy device responds to the AAA request message by generating an AAA response message and sending it to the client device. In one embodiment the AAA response message is generated based on attributes and AVPs previously extracted from other AAA request messages and/or other AAA response messages.

For example, if the AAA proxy device receives a Device Watch dog Request (DWR) message from the client device, the AAA proxy device may respond by generating and sending a Device Watch dog Answer (DWA) message to the client device on behalf of a server device. In one embodiment the DWA message is generated based on message header attributes or AVPs that were extracted from messages previously forwarded from one of the server devices to the client device. Similarly, if the AAA proxy device receives a DWR from a server device, it may respond to the server device with a DWA generated on behalf of the client device.

However, the AAA proxy device may respond to the AAA request message by performing a built-in task, without sending a response message to the client device. Additionally or alternatively, the AAA proxy device may perform some task in addition to generating a response message and sending it to the client device.

In another embodiment, the received AAA request message may be processed by user provided code, such as iRules® of F5 Networks, Inc. In one embodiment, header attributes contained in the AAA request message, as well as AVPs contained in the body of the AAA request message, are made available to the user generated code. In this way, system administrators and other users are enabled to write code to respond to AAA request messages as the types of AAA request messages change, and as the header attributes and AVPs of AAA request messages evolve over time. User generated code may similarly be executed in response to AAA response messages.

At block 418, in one embodiment, requests to retrieve, modify, or delete stored attributes and their association with particular client and/or server devices are processed. In one embodiment, the requests include requests submitted via an API from a script or other form of computer code or instruction. In one embodiment, the script may programmatically access stored configuration information to log particular types of requests, block requests from particular client devices, and the like.

The process then terminates at a return block.

It will be understood that figures, and combinations of steps in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. These program instructions may be stored on a computer readable medium or machine readable medium, such as a computer readable storage medium.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

The above specification, examples, and data provide a complete description of the manufacture and use of the composition of the described embodiments. Since many embodiments can be made without departing from the spirit and scope of this description, the embodiments reside in the claims hereinafter appended.

What is claimed as new and desired to be protected by Letters Patent of the United States is:

1. A traffic management device (TMD) interposed between a client device and a plurality of server devices, comprising:
   a transceiver to send and receive data over a network; and
   a processor that is operative to perform actions comprising:
      receiving an Authentication, Authorization, and Accounting (AAA) handshake message from the client device;
      forwarding the AAA handshake message to the plurality of server devices;
      receiving an AAA handshake response message from each of the plurality of server devices;
      extracting attributes from each of the AAA handshake response messages;
      modifying the extracted attributes based on one or more attributes of the plurality of server devices; and
      routing an AAA request message received from the client device to one of the plurality of server devices based on the extracted and modified attributes, and wherein each type of AAA message is communicated over an asynchronous protocol.

2. The TMD of claim 1, wherein the asynchronous protocol includes one or more of Diameter, Session Initiation Protocol (SIP), Remote Authentication Dial-in-In User Serviced (RADIUS), Terminal Access-Control System (TACAS), Terminal Access-Control System Plus (TACAS+), or Kerberos.

3. The TMD of claim 1, wherein the extracted attributes include an Attribute Value Pair (AVP) that is used to encapsulate protocol specific data, wherein this data includes routing information and is employed to define additional attributes for non-modified source code.

4. The TMD of claim 1, further comprising employing one or more of a script, rule, or an application programming interface (API) to edit the attributes.

5. The TMD of claim 1, further comprising receiving a device watchdog request from the client device and responding with a device watchdog answer on behalf of one of the plurality of service devices.

6. The TMD of claim 1, further comprising automatically generating a new configuration for the TMD based on the extracted attributes.

7. A system comprising:
a plurality of server devices; and
a traffic management device (TMD) in communication with the plurality of server devices, the traffic management device being locally situated in proximity to the plurality of server devices, wherein the traffic management device is in communication with a client device over a network, and wherein the traffic management device is configured to perform actions including:
receiving an Authentication, Authorization, and Accounting (AAA) handshake message from the client device;
forwarding the AAA handshake message to the plurality of server devices;
receiving an AAA handshake response message from each of the plurality of server devices;
extracting attributes from each of the AAA handshake response messages;
modifying the extracted attributes based on one or more attributes of the plurality of server devices; and
routing an AAA request message received from the client device to one of the plurality of server devices based on the extracted and modified attributes, and wherein each type of AAA message is communicated over an asynchronous protocol.

8. The system of claim 7, wherein the asynchronous protocol includes one or more of Diameter, Session Initiation Protocol (SIP), Remote Authentication Dial-in-In User Serviced (RADIUS), Terminal Access-Control System (TACAS), Terminal Access-Control System Plus (TACAS+), or Kerberos.

9. The system of claim 7, wherein the extracted attributes include an Attribute Value Pair (AVP) that is used to encapsulate protocol specific data, wherein this data includes routing information and is employed to define additional attributes for non-modified source code.

10. The system of claim 7, further comprising employing one or more of a script, rule, or an application programming interface (API) to edit the attributes.

11. The system of claim 7, further comprising receiving a device watchdog request from the client device and responding with a device watchdog answer on behalf of one of the plurality of service devices.

12. The system of claim 7, further comprising automatically generating a new configuration for the TMD based on the extracted attributes.

13. A processor readable non-transitory storage medium storing processor readable instructions that when executed by one or more processors of a network computer perform actions, comprising:
receiving an Authentication, Authorization, and Accounting (AAA) handshake message from the client device;
forwarding the AAA handshake message to the plurality of server devices;
receiving an AAA handshake response message from each of the plurality of server devices;
extracting attributes from each of the AAA handshake response messages;
modifying the extracted attributes based on one or more attributes of the plurality of server devices; and
routing an AAA request message received from the client device to one of the plurality of server devices based on the extracted and modified attributes, and wherein each type of AAA message is communicated over an asynchronous protocol.

14. The medium of claim 13, wherein the asynchronous protocol includes one or more of Diameter, Session Initiation Protocol (SIP), Remote Authentication Dial-in-In User Serviced (RADIUS), Terminal Access-Control System (TACAS), Terminal Access-Control System Plus (TACAS+), or Kerberos.

15. The medium of claim 13, wherein the extracted attributes include an Attribute Value Pair (AVP) that is used to encapsulate protocol specific data, wherein this data includes routing information and is employed to define additional attributes for non-modified source code.

16. The medium of claim 13, further comprising employing one or more of a script, rule, or an application programming interface (API) to edit the attributes.

17. The medium of claim 13, further comprising receiving a device watchdog request from the client device and responding with a device watchdog answer on behalf of one of the plurality of service devices.

18. The medium of claim 13, further comprising automatically generating a new configuration for the network computer based on the extracted attributes.

* * * * *